United States Patent [19]
Dawson et al.

[11] 3,840,874
[45] Oct. 8, 1974

[54] RADAR RECORDER & PLAYBACK SYSTEM

[76] Inventors: Gerald R. Dawson, 3832 Tomahawk Ln., San Diego, Calif. 92109; William F. Finan, 2363 Mole Rd., Secane, Pa. 19018

[22] Filed: Mar. 16, 1973

[21] Appl. No.: 342,105

[52] U.S. Cl. .......................................... 343/5 PC
[51] Int. Cl. ............................................ G01s 7/02
[58] Field of Search .................................. 343/5 PC

[56] References Cited
UNITED STATES PATENTS

| | | | |
|---|---|---|---|
| 3,444,553 | 5/1969 | Tsumura et al. | 343/5 PC |
| 3,634,887 | 1/1972 | Buchholz et al. | 343/5 PC |
| 3,710,380 | 1/1973 | Bouman et al. | 343/5 PC |
| 3,725,912 | 4/1973 | Buchholz et al. | 343/5 PC |

Primary Examiner—Maynard R. Wilbur
Assistant Examiner—G. E. Montone
Attorney, Agent, or Firm—R. S. Sciascia; G. J. Rubens; T. M. Phillips

[57] ABSTRACT

Apparatus for recording radar PPI presentations for replay on radar repeaters. Video signals and trigger pulses from the radar receiver are mixed in a mixer inverter circuit and recorded on a first track of a conical scan video tape recorder. The recording of the antenna rotation is accomplished by converting the synchro stator voltages in an analog-to-digital converter to provide a serial digital format for recording on the audio track of the recorder. For reproduction the mixed video and trigger signals are fed from the video recorder to a trigger strip inverter and video amplifier for separating the video from the trigger signal. The digital output from the video recorder is fed to a digital-to-analog synchro converter which provides the synchro voltages to the radar repeater.

2 Claims, 1 Drawing Figure

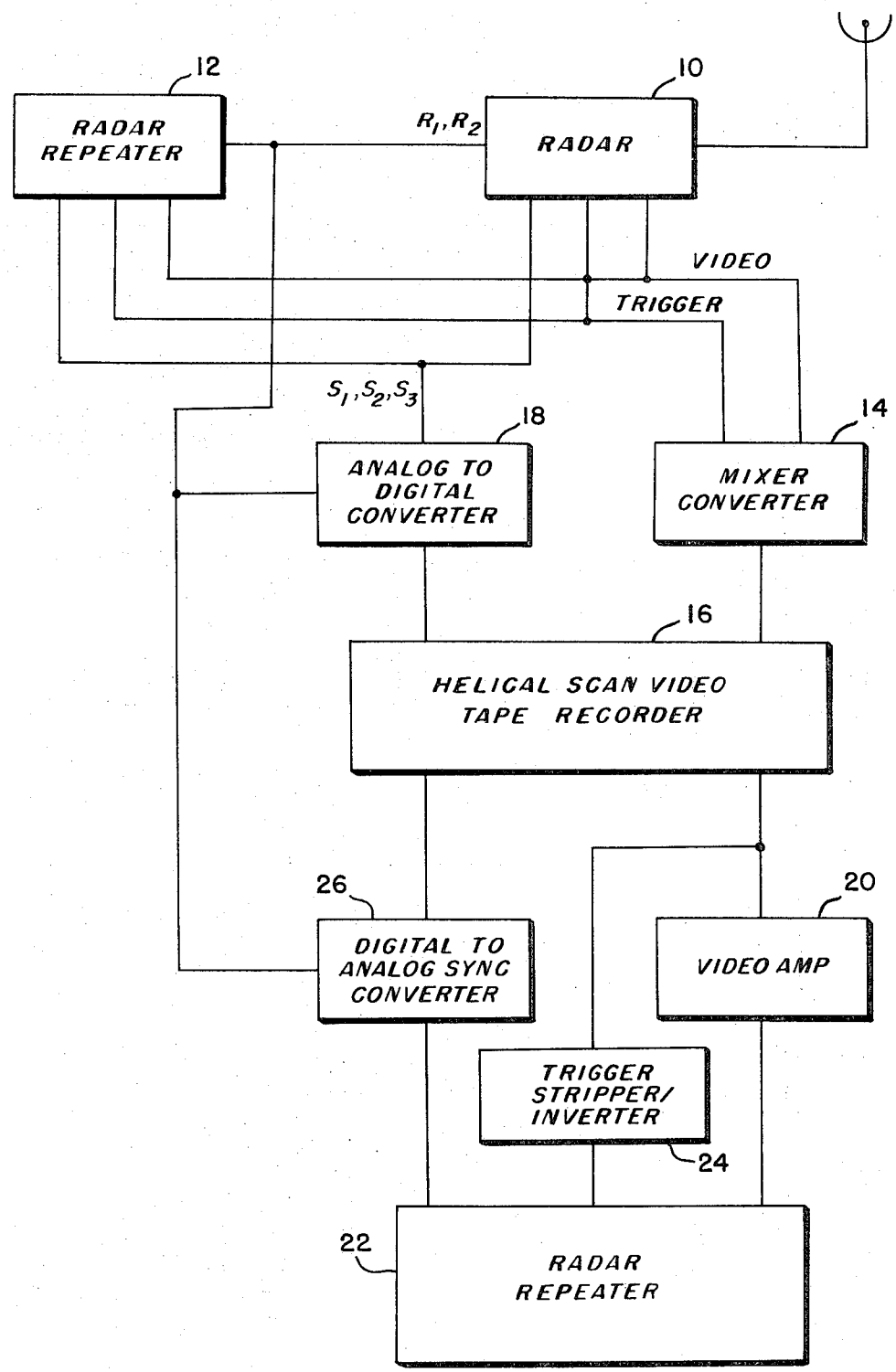

RADAR RECORDER & PLAYBACK SYSTEM

BACKGROUND OF THE INVENTION

The present invention relates to the recording of radar signals, and more particularly to the recording of radar PPI presentations and replaying the recorded signals on radar repeaters. In order to record two dimensional radar signals, three bits of information must be preserved in their proper time relationships. These are the radar trigger signals, video pulses from received echos and the antenna rotational pattern. Where a helical video tape recorder is used in the recording system care must be taken in order to preserve the video information with respect to the antenna phase and rotational pattern. In prior known systems as for example, the system disclosed by Tsumura et al. in U.S. Pat. No. 3,444,553, a frequency range for the bearing signals and other signals of about 10 KHz is required. Also that system employs a complicated polarity matching device of the recording and playback stages as well as multiplex modulation and demodulation.

SUMMARY OF THE INVENTION

The present invention provides a radar recording system which overcomes the disadvantages of prior known recording systems by inverting and mixing the PRF signals with the video signals for recording on one channel of a helical scanning video tape recorder and converting the antenna position signals to digital form for recording on the audio channel of the tape recorder. In the record mode, radar video and the radar trigger signals are mixed and fed directly into the recorder video channel. The trigger signal is recorded negatively on the video channel while the radar video is recorded positively on the same channel for ease of separation on replay.

The three stator voltages from the antenna synchro representing the antenna rotation are kept separate while maintaining accurate phase and amplitudes by converting these voltages to a serial format in a synchro analog-to-digital converter for recording on the audio track of the recorder.

In playback mode, the digitalized synchro information is converted back to analog format in the synchro converter. The video and trigger signals are recovered by means of a video amplifier and trigger stripper inverter.

OBJECTS OF THE INVENTION

An object of the invention is the provisions of a radar signal recording and reproducing system which overcomes the disadvantages of prior known recording and reproducing systems.

Another object of the invention is the provision of a radar signal recording and reproducing system wherein the trigger pulses are inverted and recorded as a negative signal mixed with the video signal on the video channel while converting the synchro stator voltages to digital format for recording on the audio channel of a helical scanning video tape recorder to provide good fidelity when reproducing the radar signal.

Other objects and many of the attendant advantages of this invention will be readily appreciated as the same becomes better understood by reference to the following detailed description when considered in connection with the accompanying drawings.

Referring now to the drawings wherein corresponding elements are provided with the same reference numerals, there is shown in the single figure radar equipment that generates the video and trigger pulse signals. The output signals from the receiver portion of radar equipment 10 are fed to a radar repeater or monitor 12 where a visual display of the received video information is projected on a scope in the usual manner. The video and trigger signals are also fed to mixer inverter 14 where the trigger signal is inverted and mixed with video signals prior to being fed to helical scanned video tape recorder 16. The antenna rotation and position information represented by synchro voltages S1, S2, and S3 are fed to a synchronous analog-to-digital converter 18 where the input synchro signals are converted to a serial digital format for recording on the audio track of the video tape recorder 16. On playback the positively recorded video signal is fed through video amplifier 20 to radar repeater 22 while the negatively recorded trigger signal is fed through trigger stripper-inverter 24 where the trigger is separated from the video and inverted and fed to radar repeater 22. On playback the digital digitalized synchro information is fed into digital analog synchro converter 26 for reconversion into analog format prior to being fed to radar repeater 22. All components of the recording and playback system are synchronized by means of reference voltage R1, R2.

In operation the helical scan video tape recorder 16 can be of the International Video Corporation - 825 recorder type which has a video bandpass of 4.2 MHz. Synchro converters 18, 24 may be of the modular synchro-to digital and digital-to-synchro converters developed by Bendix Environmental Science Division or may be of the type described in U.S. Pat. No. 3,363,244.

Obviously many modifications and variations of the present invention are possible in the light of the above teachings. It is therefore to be understood that within the scope of the appended claims the invention may be practiced otherwise than as specifically described.

What is claimed is:

1. In a recording system for recording and the subsequent reproduction of signals received in a radar receiver the combination comprising:
   a. a video channel deriving video signals from said radar receiver;
   b. a trigger pulse channel deriving trigger pulses synchronized with the video signals from said receiver;
   c. inverter mixer circuit means coupled to said video channel and to said trigger pulse channel for inverting the trigger signals and mixing the video signals and said inverted trigger signals;
   d. a bearing signal channel deriving bearing signals and reference signals from said receiver representative of the instantaneous position of the radar antenna with respect to a reference;
   e. a synchro analog-to-digital converter means in circuit with said bearing signal channel for converting the three stator voltages to a serial digital format;
   f. a helical scanning video tape recorder coupled to said inverter mixer and to said synchro analog-to-digital converter for recording said video and trigger signals on a first track and recording said bearing signals in a serial digital format on a second track;

g. and reproducing means coupled to said recording means for converting the recorded signals to radar video, trigger, reference and bearing signals.

2. The recording and reproducing system of claim 1 wherein the reproducing means includes:

a. amplifying means coupled to the output of said recording means for amplifying only the video portion of the recorded mixed signal, b. stripper inverter circuit means coupled to the output of said recording means for separating and inverting said trigger signal from the recorded mixed signal, c. converter means coupled to said recording means for converting said digitalized signals to analog voltages.

* * * * *

UNITED STATES PATENT OFFICE
CERTIFICATE OF CORRECTION

Patent No. 3,840,874        Dated October 8, 1974

Inventor(s) Gerald R. Dawson et al.

It is certified that error appears in the above-identified patent and that said Letters Patent are hereby corrected as shown below:

Column 1,    after the title,    insert the paragraph: --The invention described herein may be manufactured and used by or for the Government of the United States of America for governmental purposes without the payment of any royalties thereon or therefor.--

Signed and sealed this 13th day of May 1975.

(SEAL)
Attest:

RUTH C. MASON
Attesting Officer

C. MARSHALL DANN
Commissioner of Patents
and Trademarks